(12) United States Patent
Xu (10) Patent No.: US 11,496,876 B2
(45) Date of Patent: Nov. 8, 2022

(54) TETHERED AEROSTAT COMMUNICATION DEVICE, NETWORK ORGANIZING METHOD AND DATA TRANSMISSION METHOD THEREOF

(71) Applicant: Yixuan Xu, Tianjin (CN)

(72) Inventor: Yixuan Xu, Tianjin (CN)

(73) Assignee: Yixuan Yu, Tianjin (CN)

( * ) Notice: Subject to any disclaimer, the term of this patent is extended or adjusted under 35 U.S.C. 154(b) by 4 days.

(21) Appl. No.: 17/235,917

(22) Filed: Apr. 20, 2021

(65) Prior Publication Data
US 2022/0279329 A1 Sep. 1, 2022

(30) Foreign Application Priority Data

Feb. 26, 2021 (CN) .......................... 202110216711.2

(51) Int. Cl.
| | | |
|---|---|---|
| H04W 4/90 | (2018.01) | |
| H04W 40/02 | (2009.01) | |
| H04W 76/40 | (2018.01) | |
| H04W 76/50 | (2018.01) | |
| H04W 88/18 | (2009.01) | |
| H04W 40/04 | (2009.01) | |
| H04W 84/18 | (2009.01) | |

(52) U.S. Cl.
CPC ............ *H04W 4/90* (2018.02); *H04W 40/02* (2013.01); *H04W 76/40* (2018.02); *H04W 76/50* (2018.02); *H04W 88/18* (2013.01)

(58) Field of Classification Search
CPC .......... B64B 1/64; H04W 4/90; H04W 76/40; H04W 76/50; H04W 40/02; H04W 88/18
See application file for complete search history.

(56) References Cited

U.S. PATENT DOCUMENTS

| | | | | |
|---|---|---|---|---|
| 3,632,925 A | * | 1/1972 | Fujiwara ................. | H01H 36/00 73/317 |
| 4,434,933 A | * | 3/1984 | Tamura .................... | F23N 1/002 236/78 D |
| 4,787,575 A | * | 11/1988 | Stewart ...................... | B64B 1/50 244/33 |

(Continued)

FOREIGN PATENT DOCUMENTS

CN           110971261 A  *  4/2020  ............ G08B 25/10

*Primary Examiner* — Jenee Holland
(74) *Attorney, Agent, or Firm* — Dragon Sun Law Firm, PC; Jinggao Li; Nathaniel Perkins (57) ABSTRACT

The present invention discloses a tethered aerostat communication device for post-disaster emergency communication, comprising: a box body, a balloon arranged in the box body, an air valve control component and a communication sub-system, wherein the communication sub-system comprises a WAN communication module, a main controller, communication protocol converters, a LoRa communication module and a power supply system. The bottom of the balloon is connected to the LoRa communication module through a tethered rope. The air valve control component is detachably connected to the LoRa communication module by magnetism. The present invention further discloses a data transmission method and a network organizing communication method which use the tethered aerostat communication device for post-disaster emergency communication.

8 Claims, 4 Drawing Sheets

(56) References Cited

U.S. PATENT DOCUMENTS

| | | | | |
|---|---|---|---|---|
| 5,222,290 | A * | 6/1993 | Kvalheim | B23P 19/003 29/771 |
| 5,744,701 | A * | 4/1998 | Peterson | G01M 3/3245 73/40 |
| 5,765,529 | A * | 6/1998 | Lee | F02D 11/10 123/399 |
| 8,971,274 | B1 * | 3/2015 | Teller | H04W 40/02 370/329 |
| 9,090,323 | B1 * | 7/2015 | Ratner | B64B 1/62 |
| 9,174,720 | B1 * | 11/2015 | Ratner | B64B 1/64 |
| 9,286,776 | B1 * | 3/2016 | Morton | H04W 4/029 |
| 9,307,383 | B1 * | 4/2016 | Patrick | H04W 4/90 |
| 9,848,459 | B2 * | 12/2017 | Darrow | B64C 39/024 |
| 10,953,338 | B1 * | 3/2021 | Herren | A63H 27/10 |
| 11,072,410 | B1 * | 7/2021 | MacCallum | B64D 11/00 |
| 11,108,865 | B1 * | 8/2021 | Chakraborty | H04L 67/535 |
| 11,162,596 | B1 * | 11/2021 | Davis | F16K 31/44 |
| 11,312,466 | B1 * | 4/2022 | Slocum | B64B 1/62 |
| 11,357,948 | B2 * | 6/2022 | Bath | A61M 16/024 |
| 2008/0110436 | A1 * | 5/2008 | Baasch | F02D 11/106 123/399 |
| 2008/0199323 | A1 * | 8/2008 | Bauck | F04B 13/00 417/63 |
| 2010/0270425 | A1 * | 10/2010 | Zur | B64B 1/40 244/33 |
| 2011/0002793 | A1 * | 1/2011 | Bauck | F04B 9/1256 417/46 |
| 2011/0063182 | A1 * | 3/2011 | Sanford | H01Q 9/0407 29/601 |
| 2011/0259426 | A1 * | 10/2011 | Cramer | F16K 17/36 137/1 |
| 2012/0011701 | A1 * | 1/2012 | Bernshtein | F16L 37/42 29/469 |
| 2012/0044919 | A1 * | 2/2012 | Medapalli | H04B 1/406 370/338 |
| 2013/0052497 | A1 * | 2/2013 | Noh | H01M 50/308 429/82 |
| 2013/0312895 | A1 * | 11/2013 | Morehead | B64F 5/40 156/379 |
| 2014/0269482 | A1 * | 9/2014 | Pandey | G08B 25/08 370/312 |
| 2014/0351328 | A1 * | 11/2014 | Woods | H04W 4/021 709/204 |
| 2015/0230207 | A1 * | 8/2015 | Wang | H04N 7/185 370/329 |
| 2015/0244077 | A1 * | 8/2015 | Sanford | H01Q 1/38 343/776 |
| 2016/0073271 | A1 * | 3/2016 | Schultz | H04W 64/003 455/410 |
| 2016/0096612 | A1 * | 4/2016 | Longmier | B64B 1/58 244/31 |
| 2016/0104942 | A1 * | 4/2016 | Pera | H01Q 21/08 343/836 |
| 2016/0164562 | A1 * | 6/2016 | Houser | H04B 1/3888 455/90.3 |
| 2016/0191693 | A1 * | 6/2016 | Zavala | H01Q 21/24 455/557 |
| 2016/0329641 | A1 * | 11/2016 | Lee | H01Q 19/108 |
| 2016/0363457 | A1 * | 12/2016 | Jelavic | H04W 4/024 |
| 2017/0059206 | A1 * | 3/2017 | Lesage | F24D 3/082 |
| 2017/0142742 | A1 * | 5/2017 | Fischer | H04W 24/02 |
| 2017/0145361 | A1 * | 5/2017 | Bergmann | C12M 23/24 |
| 2017/0156044 | A1 * | 6/2017 | Meredith | H04W 4/025 |
| 2017/0170496 | A1 * | 6/2017 | Kwon | H01M 8/04089 |
| 2017/0355462 | A1 * | 12/2017 | Hoheisel | B64B 1/64 |
| 2018/0059660 | A1 * | 3/2018 | Heatzig | G05D 1/0038 |
| 2018/0118320 | A1 * | 5/2018 | Morehead | G09F 21/06 |
| 2018/0183875 | A1 * | 6/2018 | Liu | H04L 67/12 |
| 2018/0221185 | A1 * | 8/2018 | Phee | A61B 34/73 |
| 2018/0338017 | A1 * | 11/2018 | Mekuria | H04L 67/1097 |
| 2018/0354779 | A1 * | 12/2018 | Tran | B67D 7/16 |
| 2019/0031345 | A1 * | 1/2019 | Choo | B64B 1/58 |
| 2019/0065951 | A1 * | 2/2019 | Luo | G08G 1/162 |
| 2019/0193827 | A1 * | 6/2019 | Zerweckh | B64B 1/50 |
| 2019/0193828 | A1 * | 6/2019 | Ponda | B64B 1/62 |
| 2019/0280966 | A1 * | 9/2019 | Jagannath | H04L 43/0888 |
| 2020/0077499 | A1 * | 3/2020 | Shin | H05B 47/20 |
| 2020/0187150 | A1 * | 6/2020 | Eisner | H04W 76/50 |
| 2020/0275520 | A1 * | 8/2020 | Chen | H04W 80/045 |
| 2020/0288345 | A1 * | 9/2020 | Chu | H04W 72/0486 |
| 2020/0351623 | A1 * | 11/2020 | Eisner | H04W 4/80 |
| 2021/0107581 | A1 * | 4/2021 | Hara | B62J 45/4152 |
| 2021/0111909 | A1 * | 4/2021 | Teboulle | H04Q 9/00 |
| 2021/0154619 | A1 * | 5/2021 | Maggio | G01N 33/0047 |
| 2021/0180713 | A1 * | 6/2021 | Mariano | F16K 31/042 |
| 2021/0215309 | A1 * | 7/2021 | Tsao | F21S 8/02 |
| 2021/0258754 | A1 * | 8/2021 | Bolot | H04B 7/15514 |
| 2021/0293354 | A1 * | 9/2021 | Sprakel | A62C 37/50 |
| 2021/0304627 | A1 * | 9/2021 | Ponda | B64B 1/40 |
| 2021/0341948 | A1 * | 11/2021 | Lau | G05D 1/0688 |
| 2021/0345929 | A1 * | 11/2021 | Wróblewski | A61B 5/6833 |
| 2021/0405701 | A1 * | 12/2021 | Matei | H04B 5/0031 |
| 2022/0011045 | A1 * | 1/2022 | Hirsch | F25D 29/006 |
| 2022/0058610 | A1 * | 2/2022 | Bedford | G06Q 20/065 |
| 2022/0081098 | A1 * | 3/2022 | Cromie | B64C 11/26 |
| 2022/0086314 | A1 * | 3/2022 | Qi | H04N 5/2252 |
| 2022/0101456 | A1 * | 3/2022 | Schönfeld | F24H 9/2007 |

\* cited by examiner

TETHERED AEROSTAT COMMUNICATION DEVICE, NETWORK ORGANIZING METHOD AND DATA TRANSMISSION METHOD THEREOF

CROSS REFERENCE TO RELATED APPLICATION

This Application claims priority from the Chinese patent application 202110216711.2 filed Feb. 26, 2021, the content of which is incorporated herein in the entirety by reference.

TECHNICAL FIELD

The present invention relates to a tethered aerostat communication device for post-disaster emergency communication, network organizing and data transmission method using the same, and belongs to the field of communication devices.

BACKGROUND OF THE PRESENT INVENTION

In recent years, high destructive disasters such as earthquakes have occurred frequently, but it has always been very difficult to carry out post-disaster rescue. One of the important reasons is that it is difficult to get the trapped information at the first time, particularly to determine the location and trapped situation of survivors. The existing broadband wireless communication networks for civil use need to rely on the operator's base station. And the communication is often repaired and restored in the late stage of rescue. So it is impossible to get the trapped information at the first time.

At present, the Internet of Things mainly employs broadband communication or narrowband communication. The broadband communication and the narrow communication are two independent communication systems. The broadband communication includes wide area networks (WANs), local area networks (LANs), asynchronous transfer modes or the like with the advantages of short transmission distance and high speed. But it is not suitable for long-distance data transmission. The modern operators' communication networks are often built based on base stations, which need to be supported by power supply systems and wired communication networks. But it will be almost completely damaged after natural disasters such as earthquakes. The restoration and reconstruction of the communication networks often takes a long period of time, thereby missing the prime time for rescue. The narrowband communication is built on a cellular network and can be directly deployed on the GSM network, the UMTS network or the LTE network. At present, the narrowband Internet of Things, such as LoRa communication, supports the cellular data connection of low-power-consumption devices in the WAN network and keeps long standby time. So it can provide very comprehensive coverage for cellular data connection in an effective range.

Therefore, it is necessary to provide a narrowband communication device suitable for post-disaster emergency communication.

SUMMARY OF THE PRESENT INVENTION

The objective of the present invention is to overcome the defects that the existing broadband communication network hardware devices cannot be restored in time after a disaster. It establishes a floating short-message narrowband communication network which utilizes the characteristics of low cost, wide range, high reliability and low power consumption of the narrowband communication. The device can automatically and quickly lift off and integrate the narrowband communication with a balloon which collects short-message information via WiFi and then transmits it via a LoRa network.

The present invention employs the following technical solutions. A tethered aerostat communication device for post-disaster emergency communication is provided, including a box body on which an upper cover connected to the box body is arranged; and further including a balloon, an air valve control component and a communication sub-system, which are arranged in the box body.

Wherein the communication sub-system includes: a wide area network (WAN) communication module, a main controller, a LoRa communication module, communication protocol converters attached to the LoRa communication module, and a power supply system, all of which are electrically connected;

The main controller has a WiFi antenna for communication with a mobile phone of a trapped person;

The balloon, the LoRa communication module and the air valve control component are connected successively from top to bottom. The bottom of the balloon is connected to the LoRa communication module through a tethered rope. The air valve control component and the Lora communication module are detachably connected through a magnetic force.

The air valve control component includes a one-way air valve, an electrically-controlled pressure relief valve and a gas tank, which are connected successively. The magnet arranged on the pressure relief valve realizes the connection or disconnection between the LoRa communication module and a part of the air valve control component.

Further, the gas in the gas tank is helium.

Further, the communication sub-system includes a WiFi directional antenna which is arranged in the box body and configured to increase the gain of the Wifi antenna built in the main controller and extend the communication distance.

A data transmission method using the tethered aerostat communication device for post-disaster emergency communication is provided, including the following steps:

At ordinary times, the tethered aerostat communication device is in a standby state, performing routine communication by the WAN communication module, and receiving heartbeat packets from a terminal base station by the WAN communication module at preset intervals;

When the WAN communication module cannot receive the heartbeat packets from the terminal base station, the specific operation steps are as follows:

Step 1: determining whether the main controller receives an activation instruction;

Starting an activation system if the activation instruction from the terminal base station is received;

Otherwise, starting the LoRa communication module, the main controller and the communication protocol converter to establish a narrowband communication network, and executing step 2;

Step 2: determining, by the main controller, whether to receive information indicating that another LoRa communication module is operating nearby, that is, to determine whether another LoRa communication module is started nearby; and starting the activation system if the information indicating that another LoRa communication module is operating nearby is received;

Waiting for a preset period of time and if the information indicating that another LoRa communication module is operating nearby is not received, then executing step 3;

Step 3: determining, by the main controller, whether to restore communication of the WAN communication module, if it is determined to restore the communication of the WAN communication module, restoring it to the normal standby state;

Otherwise, starting the activation system.

Further, the starting the activation system mentioned in the steps 1, 2 and 3 includes the following operations:

Controlling the air valve control component to inflate the balloon, so that the balloon is lifted off to form an upward traction force to separate the LoRa communication module from a part of the air valve control component; and the LoRa communication module tethered by the balloon and the communication protocol converters attached thereto are carried to lift off; at the same time, starting the LoRa communication module, the main controller and the communication protocol converters to establish a narrowband communication network.

Further, the preset period of time in the step 2 ranges from 20 mins to 60 mins.

Further, the communication mode for the WAN communication module is one of NB-IoT mode, GSM mode, finite network communication and wireless communication.

A network organizing method using the tethered aerostat communication device for post-disaster emergency communication is provided, including the following steps:

Arranging the tethered aerostat communication devices for post-disaster emergency communication on a plurality of roofs in a certain region and a terminal base station within the region; the tethered aerostat communication devices are in a standby state, performing routine communication by the WAN communication modules, and receiving heartbeat packets from the terminal base station by the WAN communication modules at preset intervals;

When the WAN communication modules cannot receive the heartbeat packets from the terminal base station, including the following specific operation steps:

Determining whether the main controllers receive an activation instruction; if the activation instruction from the terminal base station is received, using the LoRa communication module in each tethered aerostat communication device as a sub node; acquiring the serial number of surrounding nodes by each sub node, that is, each sub node acquires information indicating whether a LoRa communication module is started nearby and packages the orientation of this sub node and the situation of surrounding nodes for global broadcasting; upon receiving the information, all sub nodes mark their own number in the packet and continue the global broadcast; upon receiving the data packet transmitted by each sub node, the terminal base station sends a receiving instruction to the original path;

After that, analyzing, by the terminal base station, the received data packets in MESH networking and selecting an optimal path with redundancy for directional broadcasting;

According to the selected optimal path, sending, by the terminal base station, a network organizing strategy to the sub nodes by the LoRa communication modules in a wireless manner, collecting data by each node, and packing and uploading it to the terminal base station according to the selected optimal path.

The terminal base station determines the data integrity and whether a node is missing, then returns a receipt instruction.

Compared with the prior art, the present invention has the following beneficial effects and remarkable progresses.

(1) The tethered aerostat communication device for post-disaster emergency communication provided by the present invention is low in layout cost. The manufacturing cost for a single device is only in thousands. And the WiFi signal can effectively cover the whole building. The range of LoRa communication exceeds 5 kilometers.

(2) By the network organizing method using the tethered aerostat communication device for post-disaster emergency communication provided by the present invention, an emergency communication network can be automatically and quickly established at the first time after a disaster, so that the prime time for rescue is grasped.

(3) In accordance with the present invention, the information collection capability can be effectively enhanced. The cost for rescue can be reduced. And the rescue effectiveness can be greatly improved.

(4) The short-message system established by the present invention can provide effective trapped information.

(5) By the data transmission method using the tethered aerostat communication device for post-disaster emergency communication provided by the present invention, it is automatically determined to start and activate the system in a redundant design.

(6) In the present invention, effective redundant networking can be realized by utilizing the advantage of long distance of the LoRa communication. And the reliability of the system is high.

In which:

| 1: balloon; | 2: LoRa communication module; |
| 3: one-way air valve; | 4: gas tank; |
| 5: pressure relief valve; | 6: WiFi directional antenna; |
| 7: power supply system; | 8: main controller; |
| 9: box. | |

DETAILED DESCRIPTION OF THE PRESENT INVENTION

To make the objectives, technical solutions, beneficial effects and remarkable progresses of the embodiments of the present invention clearer, the technical solutions in the embodiments of the present invention will be clearly and completely described below with reference to the drawings provided in the embodiments of the present invention. Apparently, the embodiments described herein are some but not all of the embodiments of the present invention. All other embodiments obtained on the basis of the embodiments in the present invention by a person of ordinary skill in the art without paying any creative effort shall fall into the protection scope of the present invention.

In the present invention, unless otherwise explicitly specified and defined, the terms "mount", "fix", "connect" or the like should be interpreted in a broad sense. For example, it may be fixed connection, detachable or movable connection, or integration; it may be direct connection, indirect connection through an intermediate medium, or invisible signal connection; it may be internal communication between two elements or interaction between two elements. Unless otherwise explicitly defined, for a person of ordinary skill in the art, the specific meanings of the terms in the present invention can be interpreted according to specific conditions.

It is to be noted that the narrowband communication network constructed in the present invention specifically refers to the narrowband communication network constructed by the LoRa communication module, rather than the WAN communication constructed by the NB-IoT module.

It is also to be noted that, the following specific embodiments can be combined with each other. The same or similar concepts or processes may not be repeated in some embodiments.

Figure 1:
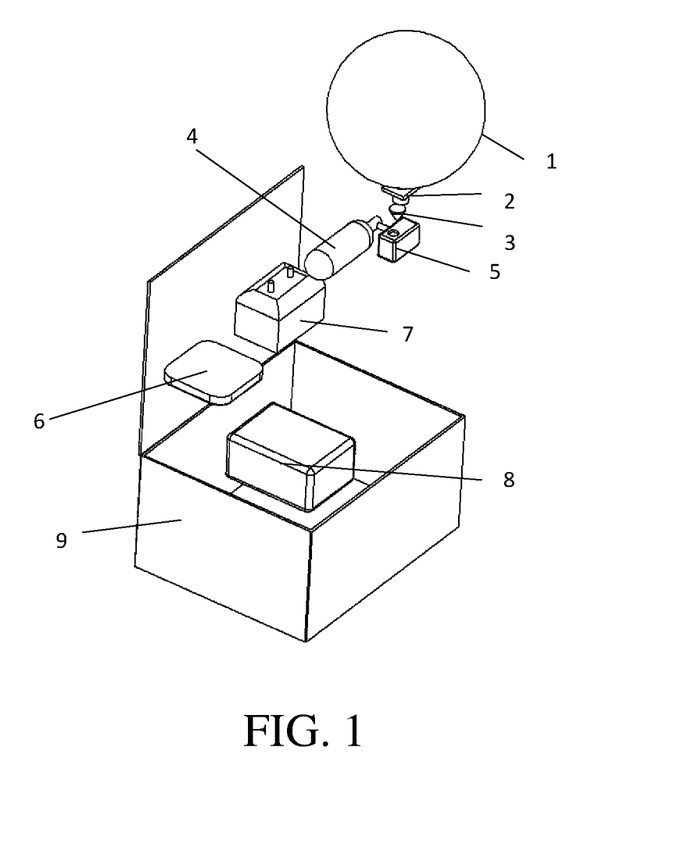
FIG. 1 is a structure diagram of the tethered aerostat communication device for post-disaster emergency communication according to the present invention.

As shown in FIG. 1, a tethered aerostat communication device for post-disaster emergency communication is provided including: a box 9 made of an ASA material on which an upper cover connected to the box is arranged, with the upper cover of the box being in a closed state usually; a balloon 1, an air valve control component and a communication sub-system, which are arranged in the box 9. The balloon 1 is preferably a rubber balloon. The communication sub-system includes: an NB-IoT module serving as a wide area network (WAN) communication module, a Raspberry Pi microcomputer serving as a main controller, a WiFi directional antenna 6, a pair of RS485 communication protocol converters, a LoRa communication module 2 and a storage battery serving as a power supply system 7, all of which are electrically connected. The communication protocol converters include a ground communication protocol converter and an air protocol converter. The communication protocol converters may be attached to the rear side of the LoRa communication module by pasting or in other ways, and can be lifted off together with the LoRa communication module. The WAN communication module may also be selected from a GSM module or a WAN communication module established in form of a wired network, WiFi or the like. The bottom of the balloon 1 is connected to the LoRa communication module through a tethered rope. The one-way air valve 3 is a tapered rubber nozzle, on which a plastic buckle structure is mounted, a wide mouth portion of which is used to accommodate the bottom of the balloon 1 and a tip of which is connected to an electrically-controlled pressure relief valve 5. An electromagnet is arranged on the pressure relief valve 5. And a hole for allowing a gas tank 4 to be connected thereto is formed on the pressure relief valve 5. The gas tank 4 is filled with helium. When the balloon 1 is inflated, the electromagnet is bounced off to release the one-way air valve 3, so that the balloon 1, the LoRa communication module 2, the communication protocol converters and the one-way air valve 3 are all lifted off.

The tethered aerostat communication device is mounted on a roof and is in a standby state usually. The NB-IoT module is used for routine communication. Heartbeat packets transmitted by a terminal base station are received by the NB-IoT module at preset intervals. Except for the storage battery, other modules do not operate. In this case, the power consumption is very low. The WiFi function of the main controller is disenabled, so only part of the MCU is enabled in a low power consumption module to determine whether the heartbeat packets are normal. Of course, the storage battery may be replaced with disposable batteries such as lithium batteries for power supply. The heartbeat packet described herein does not include any actual information and may be simple information or an empty packet containing only the header.

Figure 2:
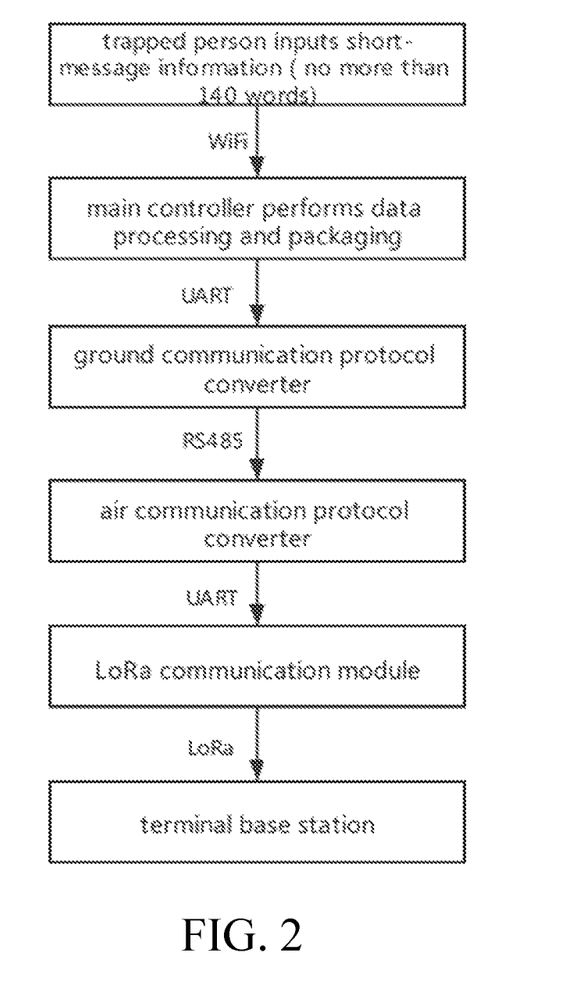
FIG. 2 is a schematic view of the data transmission method using the tethered aerostat communication device according to the present invention.
Figure 3:
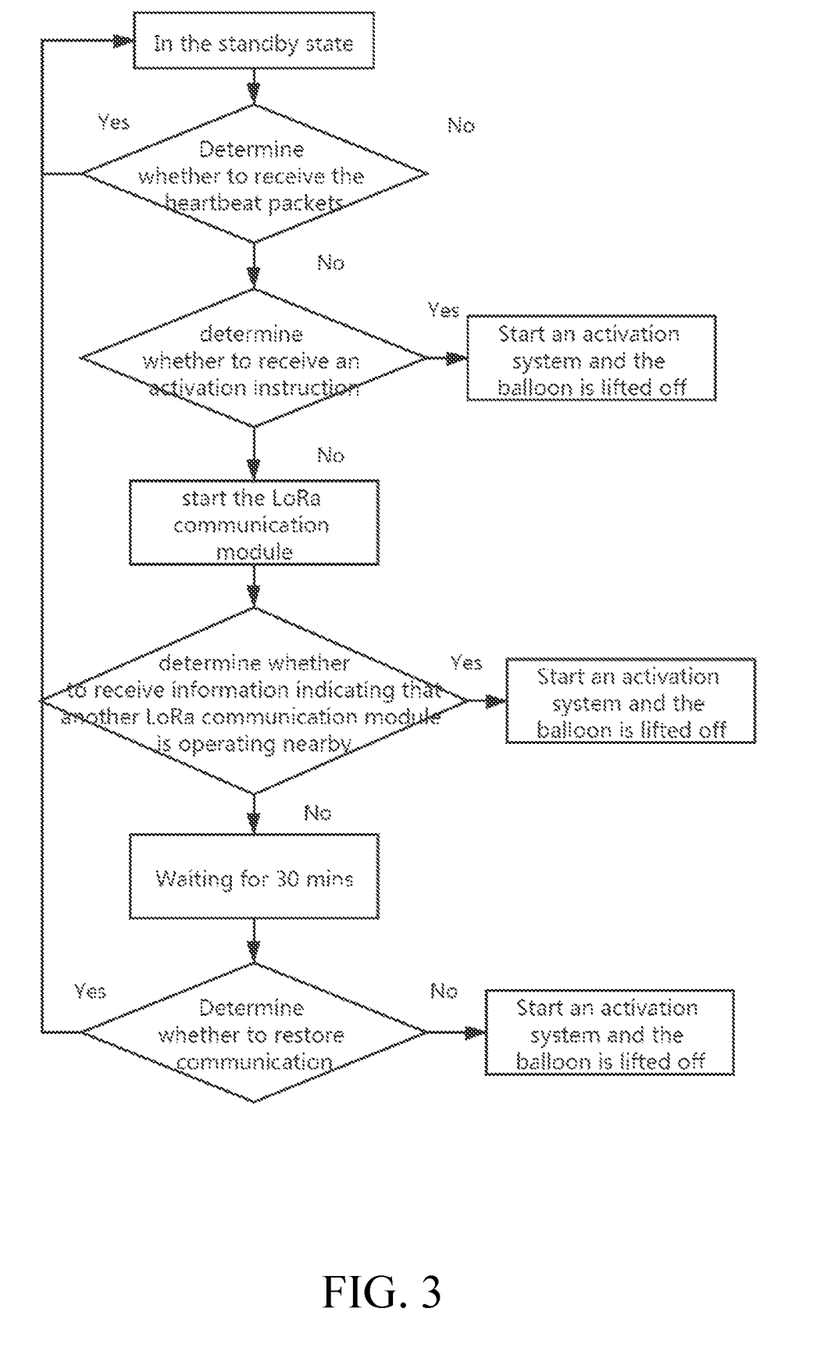
FIG. 3 is a flowchart of the data transmission method using the tethered aerostat communication device according to the present invention.
Figure 4:
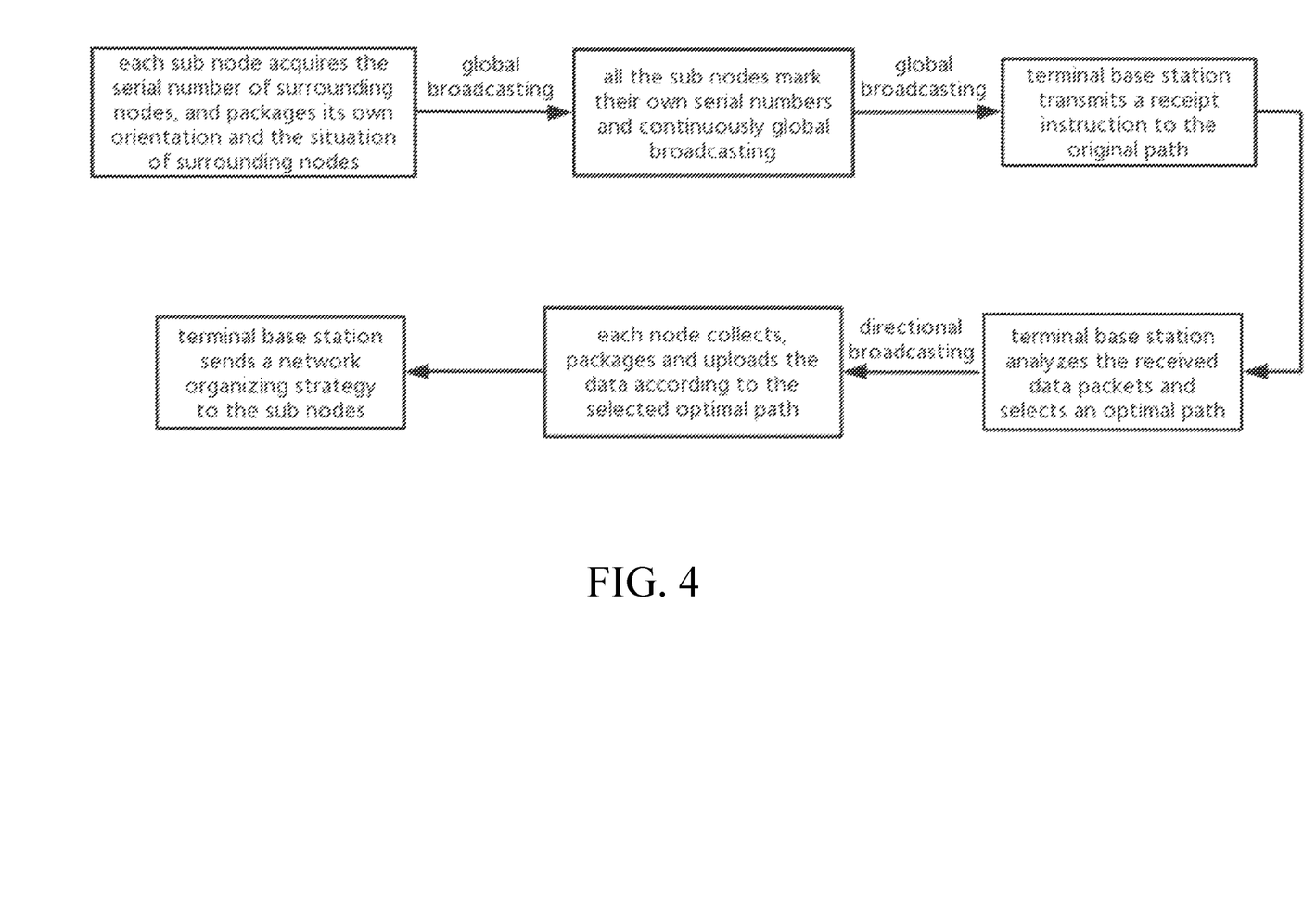
FIG. 4 is a schematic flowchart of the networking communication method according to the present invention.

As shown in FIGS. 2, 3 and 4, when a disaster such as earthquake occurs and the local communication base station is damaged to lead to communication disruption, the NB-IoT module cannot receive the heartbeat packet from the terminal base station and then determines whether the main controller receives an activation instruction. If the main controller receives an activation instruction, an activation system is started. The starting the activation system includes the following operation steps: the main controller receives an activation instruction transmitted by the terminal base station through a narrowband communication network, and controls the pressure relief valve 5 to inflate the balloon 1. Then the balloon 1 is lifted off to form an upward traction force to separate the LoRa communication module 2 from the air valve control component, so as to open the upper cover of the box 9 to carry the LoRa communication module 2 tethered thereto to lift off. Meanwhile, the LoRa communication module, the main controller and the communication protocol converters are started to establish a LoRa narrowband communication network. The LoRa communication module communicates with the main controller through the communication protocol converters.

At this time, as shown in FIG. 4, the LoRa communication module 1 in each tethered aerostat communication device is used as a sub node. Each sub node acquires the serial number of surrounding nodes, which means acquiring information indicating whether a LoRa communication module is started nearby, and packaging its own orientation and the situation of surrounding nodes for global broadcasting. At this time, due to the influence from the disaster, some sub nodes are damaged and unable to continuously communicate according to the original networking scheme. So all the sub nodes mark their own serial numbers in data packets and continuously perform global broadcasting after they receive the message. Upon receiving the data packet transmitted by each sub node, the terminal base station transmits a receipt instruction to the original path. Subsequently, the terminal base station analyzes MESH networking on the received data packets and selects an optimal path with redundancy for directional broadcasting. According to the selected optimal path, the terminal base station sends a network organizing strategy to the sub nodes in a wireless manner by using the LoRa communication mode. That is like transmitting a packet containing the networking mode in a point-to-multiple manner at the first time. Upon receiving the network organizing strategy, each node reduces the bandwidth load and the power consumption in this network organizing mode according to the point-to-point or point-to-two/three points optimized network organizing strategy. Each node collects data (whether the collected data is still the serial number of surrounding nodes acquired above, its own orientation and the situation of surrounding nodes are packaged), packages and uploads the data according to the selected optimal path. The terminal base station determines the data integrity and whether a node is missing, then returns a receipt instruction. The above-mentioned MESH networking is the well-known "wireless mesh network". By means of the characteristics of multi-hop interconnection and mesh topology, the MESH networking has evolved into an effective solution suitable for various wireless access networks such as broadband home networks, community networks, enterprise networks and metropolitan area networks. The MESH networking generally consists of three different types of wireless network elements: gateway routers (routers with a gateway/ bridge function), MESH routers (access points) and MESH clients (mobile terminals, etc.). The MESH clients access the wireless MESH routers in a wireless manner. The wireless MESH routers form a relatively stable forwarding network in a multi-hop interconnection manner. In the general network architecture of the WMN, any MESH router may be used as a data forwarding relay for other MESH routers. And some MESH routers have the additional capability of Internet gateway.

If the activation instruction is not received, the LoRa communication module 2, the main controller and the pair of RS485 communication protocol converters are started. The RS485 communication protocol converters convert the UART communication protocol into the RS485 protocol and convert the RS485 protocol into the UART protocol. The main controller 8 transmits an AT instruction to the LoRa communication module in the air by using the communication protocol converters to control the operation of the LoRa communication module, then records and stores data. As shown in FIG. 2, at this time, the LoRa communication module 2 establishes a narrowband communication network which can cover the whole city. After a trapped person inputs short-message information with no more than 140 words by a mobile phone, the Raspberry Pi will use the WiFi antenna built in the main controller and the Wifi directional antenna to realize communication between the tethered aerostat communication device on the roof and the trapped person in a WiFi manner. The short-message information with no more than 140 words is acquired from the trapped person, and the data is processed and packaged. Subsequently, the LoRa communication module 2 converts the UART communication protocol into the RS485 protocol and then converts the RS485 protocol into the UART protocol by using the RS485 communication protocol converters. The purpose is to communicate with the Raspberry Pi and transmit the data to the terminal base station. The Wifi directional antenna is automatically started when the main controller 8 starts its built-in WiFi antennae.

After the activation instruction is received, an activation system is started. The operation process is as described above and will not be repeated here. If the short-message information is not received, it is waited for 30 mins. Of course, 20 mins, 40 mins or 60 mins can also be adopted. If the tethered aerostat communication device is not restored or detected, the activation system is started. If the tethered aerostat communication device is restored or the tethered aerostat communication device is repaired on site by an operator and then restored to receive heartbeat packets, it is restored to the standby state.

The foregoing embodiments and specific examples are merely for describing the technical solutions of the present invention and not intended to limit the present invention. Although the present invention has been described in details by the foregoing embodiments, it should be understood by a person of ordinary skill in the art. The modifications may be made to the technical solutions recorded in the foregoing embodiments. Or equivalent replacements may be made to some or all of the technical features. These modifications or replacements shall not make the essence of the corresponding technical solutions depart from the scope of the technical solutions of the embodiments of the present invention. Non-essential improvements and adjustments or replacements made according to the content of this specification by those skilled in the art shall fall into the protection scope of the present invention.

What is claimed is:

1. A tethered aerostat communication device for post-disaster emergency communication, comprising a box body (9) on which an upper cover connected to the box body (9) is arranged, a balloon (1), an air valve control component and a communication sub-system, which are arranged in the box body (9);

wherein the communication sub-system comprises: a wide area network (WAN) communication module, a main controller (8), a LoRa communication module (2), communication protocol converters attached to the LoRa communication module (2), and a power supply system (7), all of which are arranged in the box body and electrically connected;

wherein the main controller (8) has a WiFi antenna for communicating with a mobile phone of a trapped person;

wherein the balloon (1), the LoRa communication module (2) and the air valve control component are connected successively from top to bottom; the bottom of the balloon (1) is connected to the LoRa communication module (2) through a tethered rope; the air valve control component and the LoRa communication module (2) are detachably connected through a magnetic force; and wherein the tethered aerostat communication device is configured to be utilized in a data transmission method comprising the following steps:

the tethered aerostat communication device is in a standby state at ordinary times, performing routine communication by the WAN communication module and receiving heartbeat packets from a terminal base station by the WAN communication module at preset intervals;

when the WAN communication module cannot receive the heartbeat packets from the terminal base station, comprising the following specific operation steps:

step 1: determining whether the main controller (8) receives an activation instruction;

if the activation instruction from the terminal base station is received, starting an activation system;

otherwise, starting the LoRa communication module (2), the main controller (8) and the communication protocol converters to establish a narrowband communication network, and executing step 2;

step 2: determining, by the main controller (8), whether to receive information indicating that another LoRa communication module (2) is operating nearby, that is, to determine whether another LoRa communication module (2) is started nearby, and starting the activation system if the information indicating that another LoRa communication module (2) is operating nearby is received;

if the information indicating that another LoRa communication module (2) is operating nearby is not received, waiting for a preset period of time and then executing step 3;

step 3: determining, by the main controller (8), whether to restore communication of the WAN communication module, if the communication of the WAN communication module is determined to be restored, restoring the communication of the WAN communication module to the standby state;

otherwise, starting the activation system.

2. The tethered aerostat communication device for post-disaster emergency communication according to claim 1, wherein the air valve control component comprises a one-way air valve (3), an electrically-controlled pressure relief valve (5) and a gas tank (4) which are connected successively; and a magnet for realizing connection or disconnection between the LoRa communication module (2) and a part of the air valve control component is arranged on the electrically-controlled pressure relief valve (5).

3. The tethered aerostat communication device for post-disaster emergency communication according to claim 2, wherein gas in the gas tank (4) is helium.

4. The tethered aerostat communication device for post-disaster emergency communication according to claim 1, wherein the communication sub-system further comprises a WiFi directional antenna which is arranged in the box body and configured to increase gain of the Wifi directional antenna built in the main controller (8) and extend communication distance.

5. The tethered aerostat communication device for post-disaster emergency communication according to claim 1, wherein communication mode for the WAN communication module is one of NB-IoT mode, GSM mode, finite network communication and wireless communication.

6. The data transmission method according to claim 1, wherein the starting the activation system mentioned in the steps 1, 2 and 3 comprises the following operations:

controlling the air valve control component to inflate the balloon (1), So that the balloon (1) is lifted off to form an upward traction force to separate the LoRa communication module (2) from a part of the air valve control component; and the LoRa communication module (2) tethered by the balloon (1) and the communication protocol converters attached thereto are carried to lift off; at a same time, starting the LoRa communication module (2), the main controller (8) and the communication protocol converters to establish a narrowband communication network.

7. The data transmission method according to claim 1, wherein the preset period of time in the step 2 is 20 mins to 60 mins.

8. A network organizing communication method using the tethered aerostat communication device according to claim 1, comprising the following steps:

arranging tethered aerostat communication devices for post-disaster emergency communication on a plurality of roofs in a certain region and a terminal base station within the certain region; the tethered aerostat communication devices is in the standby state, performing routine communication by WAN communication modules, and receiving heartbeat packets from the terminal base station by the WAN communication modules at preset intervals;

when the WAN communication modules cannot receive the heartbeat packets from the terminal base station, comprising the following specific operation steps:

determining whether the main controllers (8) receive an activation instruction; if the activation instruction from the terminal base station is received, using the LoRa communication module (2) in each tethered aerostat communication device as a sub node; acquiring a serial number of surrounding nodes by each sub node, which means acquiring information indicating whether a LoRa communication module (2) is started nearby, and packaging an orientation of each sub node and a situation of surrounding nodes for global broadcasting; upon receiving the information, each sub node marks a corresponding number in the packet and continue the global broadcast; upon receiving the data packet transmitted by each sub node, the terminal base station transmit a receiving instruction to an original path;

then, analyzing, by terminal base station, the received heartbeat packets in MESH networking and selecting an optimal path with redundancy for directional broadcasting;

according to the selected optimal path, sending, by the terminal base station, a network organizing strategy to the sub nodes by the LoRa communication modules in a wireless manner, collecting data by each node, and packing and uploading the data to the terminal base station according to the selected optimal path.

* * * * *